United States Patent
van Herk et al.

(10) Patent No.: US 8,331,526 B2
(45) Date of Patent: Dec. 11, 2012

(54) ON-LINE CONE BEAM CT RECONSTRUCTION

(75) Inventors: Marcel van Herk, Amsterdam (NL); Jan-Jakob Sonke, Amsterdam (NL); Lambert Zijp, Amsterdam (NL); Peter Remeijer, Amsterdam (NL)

(73) Assignee: Elekta AB (publ), Stockholm (SE)

( * ) Notice: Subject to any disclaimer, the term of this patent is extended or adjusted under 35 U.S.C. 154(b) by 10 days.

(21) Appl. No.: 12/600,386

(22) PCT Filed: May 17, 2007

(86) PCT No.: PCT/EP2007/004427
§ 371 (c)(1),
(2), (4) Date: Apr. 12, 2010

(87) PCT Pub. No.: WO2008/141656
PCT Pub. Date: Nov. 27, 2008

(65) Prior Publication Data
US 2011/0206178 A1    Aug. 25, 2011

(51) Int. Cl.
*A61B 6/00* (2006.01)
*G06K 9/00* (2006.01)
(52) U.S. Cl. ............... 378/4; 378/8; 378/19; 382/131
(58) Field of Classification Search .............. 378/4, 8, 378/19
See application file for complete search history.

(56) References Cited

U.S. PATENT DOCUMENTS

| | | | |
|---|---|---|---|
| 7,844,317 B2 * | 11/2010 | Salla et al. | 600/407 |
| 2004/0218719 A1 * | 11/2004 | Brown et al. | 378/95 |
| 2004/0234115 A1 * | 11/2004 | Zijp et al. | 382/131 |
| 2010/0166286 A1 * | 7/2010 | Sonke et al. | 382/132 |

FOREIGN PATENT DOCUMENTS

WO    2004066211 A    8/2004

OTHER PUBLICATIONS

Rit et al., Respiratory Signal Extraction for 4D CT Imaging of the Thorax from Cone-Beam CT projections, MICCAI, LNCS 3749, 2005, pp. 556-563.*
Sonke, Four-dimensional Cone Beam Computed Tomography-guided Radiotherapy for Lung Cancer Patients, Department of Radiation Oncology, The Netherlands Cancer Institute, European Oncological Disease, 2006, pp. 27-31.*
Rit et al., On-the-fly motion-compensated cone-beam CT using an a priori model of respiratory motion, Med Phys, 36 (6), Jun. 2009, pp. 2283-2296.*
Zijp, L. et al., "Extraction of the Respiratory Signal from Sequential Thorax Cone-Beam X-Ray Images", Proceedings of the International Conference on the Use of Computers in Radiation Therapy, No. 14th, 2004.
Sonke, Jan-Jakob et al., "Respiratory Correlated Cone Beam CT" Medical Physics, AIP, Melville, NY, US, vol. 32, No. 4, Mar. 30, 2005, pp. 1176-1186.
International Search Report, Oct. 12, 2007.
PCT Written Opinion of the International Search Authority.

* cited by examiner

*Primary Examiner* — Alexander H Taningco
(74) *Attorney, Agent, or Firm* — Westman, Champlin & Kelly, P.A.; Z. Peter Sawicki

(57) ABSTRACT

An in-line 4D cone beam CT reconstruction algorithm queues a limited number of projection images such that the phase determination algorithm can look-ahead. At regular intervals, the queue is scanned and those images which have enough look-ahead to obtain phase information are filtered and back-projected. The algorithm thus keeps up with the image acquisition speed and produces a 4D reconstruction within a few seconds of the end of scanning.

20 Claims, 4 Drawing Sheets

ON-LINE CONE BEAM CT RECONSTRUCTION

This Application is a Section 371 National Stage Application of International Application No. PCT/EP2007/004427, filed May 17, 2007 and published as WO 2008/141656 A1 on Nov. 27, 2008, the content of which is hereby incorporated by reference in its entirety.

FIELD OF THE INVENTION

The present invention relates to cone beam CT reconstruction—i.e. reconstruction of a three-dimensional structure from a sequence of x-ray images of the structure taken from differing directions. It also seeks to derive information as to the change of a periodically varying structure with time, and to do so in near real time.

BACKGROUND ART

The advent of integrated cone-beam CT on linear accelerators is leading to more detailed information of anatomical motion in treatment position. For instance, large-scale 4D cone beam CT scanning led to the discovery of significant baseline shifts in lung tumor position. This in turn highlighted the necessity of image guidance for lung radiotherapy, in particular for hypo-fractionated schemes.

Our previous application WO2004/066211 described a route to identifying periodic patterns in the two dimensional images of a patient's abdomen from which a cone beam tomography is computed. The two-dimensional images are collapsed along an axis transverse to the cranio-cordal axis to produce a one-dimensional image. Multiple such one-dimensional images are assembled side-by-side in time order to produce a two-dimensional image in which one axis represents time and the other is aligned with the cranio-cordal axis. Periodicities in this image, or a selected region thereof, indicate a periodic movement of a feature in the abdomen in the cranio-cordal direction; the breathing cycle being a principal example. Analysis of the final image can therefore reveal the position in the breathing cycle of a specific image; the images can then be allocated to an appropriate bin and a reconstruction obtained from the images in a specific bin to give an accurate three dimensional image of a selected point in the breathing cycle free from respiration artefacts.

SUMMARY OF THE INVENTION

The present invention seeks to provide an in-line 4D cone beam CT reconstruction algorithm, i.e. one that works in parallel with image acquisition. The system of WO2004/066211 works well, but analysis of the images takes place off-line, i.e. after scanning is complete. For efficient image guidance, a 4D scan image analysis algorithm is needed which can produce an image or images during or immediately after treatment, from the images that are acquired during that treatment cycle.

For hypofractionation, on-line verification and correction of tumor position is extremely important. Cone-beam CT (CBCT) provides soft tissue localization without implanting markers. However, 3D CBCT of the lung area has a poor quality in cases where the motion is large.

This aim is, at first sight, contradictory to the method of WO2004/066211. Phase determination for each image is obtained from the final composite image, i.e. after collection of all the images, but computing the tomographs requires the phase information and must therefore await production of the final image. Thus, processing can (seemingly) only begin after treatment has ended.

The present invention therefore provides an imaging system for a object exhibiting internal periodic motion comprising a source of penetrating radiation and a two-dimensional detector for the radiation, the source and the detector being rotateable around an axis lying on the beam path from the source to the detector, a storage means for images obtained from the detector, a control means for initiating rotation of the source and the detector and for obtaining images from the detector at a plurality of rotation angles over time, a processing means for (i) condensing the images in a direction transverse to an axis to produce a one-dimensional image, (ii) collating the one-dimensional images obtained up to that point side-by-side into a two dimensional image, (iii) analysing the two-dimensional image thus obtained to identify periodic patterns, (iv) allocating phase information to the images in the storage means on the basis of that analysis, (v) selecting images in the storage means having like phase information, and (vi) backprojecting the selected images, the control means being adapted to invoke the processing means after a plurality of images have been placed in the storage means, and then place further images in the storage means and further invoke the processing means.

The images can be filtered prior to processing, to enhance the visibility of desired features. A range of conventional filters can be applied.

The penetrating radiation is suitably x-radiation, which can be detected by a number of known flat panel detectors.

The object referred to above will typically be a patient, in which case the motion is likely to be a breathing motion. The invention is applicable to other contexts, however.

The images can be selected by allocating images to one of a plurality of bins, with images having like phase information being allocated to the same bin.

Thus, we choose to queue a limited number of pre-processed projection images such that the phase determination algorithm can look-ahead without causing too much waiting time at the end of reconstruction. At regular intervals, the queue is scanned and those images which have enough look-ahead to obtain phase, bin, and gantry speed are filtered and back-projected. The algorithm thus keeps up with the image acquisition speed (typically of the order of 5.5 frames per second) and produces a 4D reconstruction (of, say 10×256<3> pixels) within a few seconds of the end of scanning. A local rigid registration algorithm is then used to match the tumor region defined in the mid-ventilation frame of our 4D planning CT with each of the phases of the 4D CBCT.

An animation technique provides rapid visual verification. The mean position of the tumor is computed and used for correction, while the amplitude is reviewed to validate the margin. 3D validation scans are made after correction and treatment.

BRIEF DESCRIPTION OF THE DRAWINGS

An embodiment of the present invention will now be described by way of example, with reference to the accompanying figures in which.

DETAILED DESCRIPTION OF ILLUSTRATIVE EMBODIMENTS

The process of the present invention has been embodied on an Elekta™ Synergy™ System, i.e. a regular linear accelerator equipped with an additional X-ray tube and flat-panel imager perpendicular to the path of the treatment beam. X-ray images are, in this example, collected at 5.5 frames per second. For practical reasons, collected data is recorded at a resolution of 512×512 pixels. The flat panel imager has a field of view of 26 cm at the isocenter. For 4D image acquisition, the system is generally used with the detector in a central position, resulting in a scan volume of 26×26×26 cm<3>. Typically, a 2 cGy dose is used for 4D lung image acquisition. The scan time is, however, prolonged to 4 minutes (corresponding to approximately 1200 frames) to collect enough (+−80) respiratory cycles. In our previous method for 4D image reconstruction (described above), images were retrospectively sorted based on respiratory phase information extracted by automatic image analysis of the diaphragm position. To implement on-line image guidance based on 4D images for hypofractionated schemes it is necessary to accelerate the 4D reconstruction and implement efficient 4D image registration and validation, as follows.

4D Cone Beam CT Reconstruction

Figure 1:
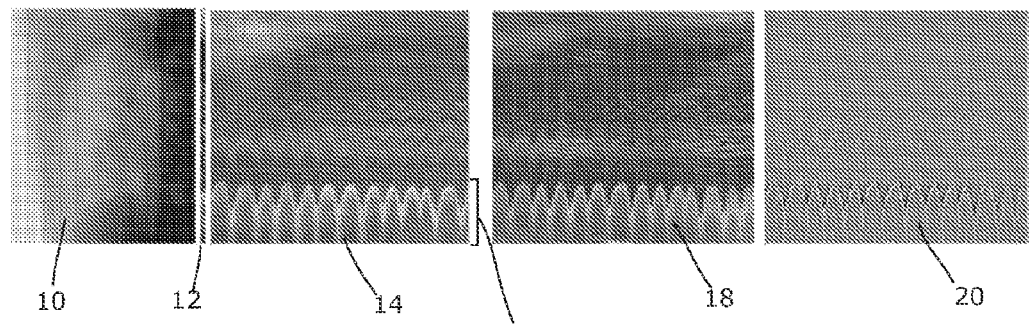
FIG. 1 illustrates sample images used in the invention.

To extract the respiratory phase from the projection images, we prepare a so-called 'Amsterdam Shroud', shown in FIG. 1. This is a summary of the raw projection data, enhancing cranio-caudal (CC) motion of the patient's structures. It is made by enhancing the projection images 10 (if necessary), projecting them perpendicular to the axis of rotation leaving ID information 12 in the CC direction), and concatenating the thus-obtained columns for all gantry angles to form a composite image 14. The phase of the respiratory motion can then be extracted by analyzing a region of interest that covers both diaphragms. Several steps in the previous algorithm were retrospective (i.e., could only be done after completion of the full acquisition): in particular the automatic region of interest (ROI) detection, line-by-line registration to detect motion, and trend removal and phase detection in the motion signal. Finally, the phase signal was used to sort the projection images into the correct bin of (say) 10 bins. All these aspects need to change when the process is to be executed in-line, i.e., simultaneous with image acquisition and without knowledge of all subsequent images.

Thus, to summarise, FIG. 1 shows the production of an 'Amsterdam shroud', by horizontal averaging of each projection image 10 into one column 12 and concatenating the columns to a shroud image 14. In our previous process, a region of interest 16 was placed automatically around the moving diaphragms for analysis of respiratory phase. The algorithm of the present invention produces an image 18 with improved sensitivity by avoiding hard thresholds. However, it therefore more easily picks up image details outside the patient, causing horizontal streaks. By processing the shroud with a horizontal unsharp mask as shown in 20, the diaphragm and tumor signals are isolated. Finally, respiratory motion is again analyzed by correlating subsequent lines but now over the entire extent of the shroud image.

A 4D Image Reconstruction Algorithm

Figure 2:
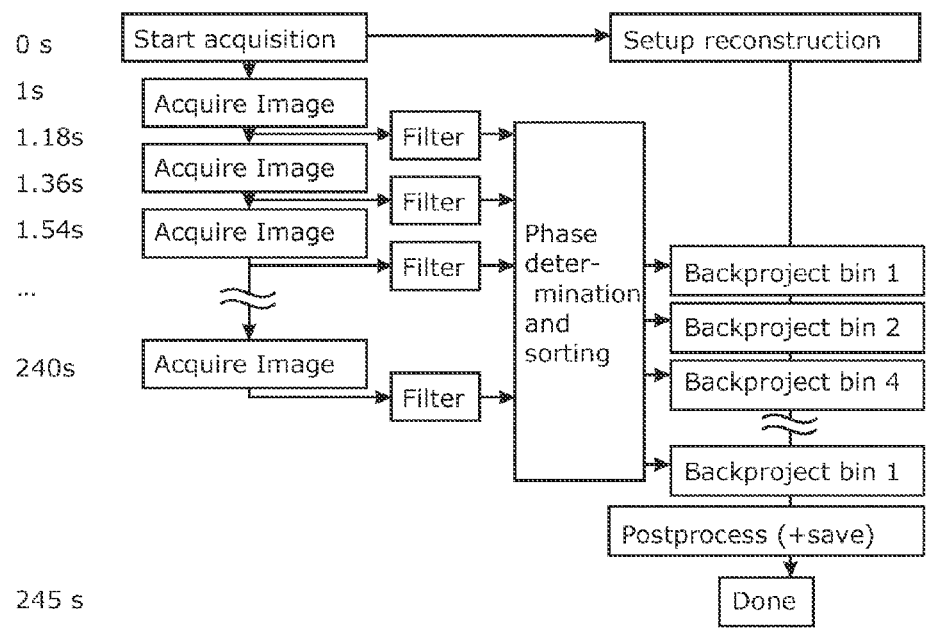
FIG. 2 shows a flowchart for the image analysis method of the present invention.

The algorithm of the present invention is based on a limited look-ahead by buffering part of the projection data. Its flowchart is shown in FIG. 2. For efficiency, optional downsizing and conversion to radiological thickness is performed identically for cone beam reconstruction and phase determination. The information is appended to the shroud image, and then further processed up but not including the backprojection into the selected phase bin. Since this step cannot be completed (needing look-ahead for phase analysis), the result is queued until later. Also, the shroud image generation has been improved and simplified. The original algorithm used several hard-set parameters to suppress unwanted information. The new algorithm is simpler; it takes the vertical derivative, then performs a horizontal blur matched to the scale of the relevant structures (diaphragm) and finally takes the maximum of all columns. The end result is optimally tuned to detecting diaphragms, and relatively robust to unwanted features such as objects outside the patient such as components of the couch. FIGS. Ic, Id, and Ie compare shroud images of the original and new algorithms. An advantage of the new algorithm is that it has no thresholds and therefore will lock onto other perhaps smaller structures if the diaphragm is not available. The motion detection is unchanged, except that no region of interest need be used: instead, the entire height of the shroud image can be used. For trend removal and phase detection (via a Hubert transform) a window is used of 32 frames. This means that reconstruction can lag by only 16 frames on acquisition.

A high-speed cone beam reconstruction code based on the Feldkamp algorithm for limited cone reconstruction was developed. The algorithm consists of a fast fourier transform (FFT) based filtration step on the logarithmic image data followed by straightforward back-projection and accumulation. By optimizing cache speed by reordering data and loops, use of lookup tables, and application of both real and imaginary channels in the FFT based filter, a very high speed of reconstruction is obtained. As a result, the 4D reconstruction algorithm generally keeps up with acquisition, i.e., a reconstructed image cube of 10×256<3> is available within 5 s at the end of the acquisition. The quality of the modified algorithm was validated by comparing extracted phase signals and by visual comparison of the shroud images and reconstructed scans.

FIG. 2 shows a flowchart of the in-line 4D cone beam acquisition. By buffering the pre-processed projection images, it becomes possible to perform phase determination and sorting during image acquisition. As a result, reconstruction is ready a few seconds after the end of scanning. Typically the 4D reconstruction is sorted into 10 bins based on either phase or amplitude. The numbers on the left show the time in seconds from the start of acquisition for a 10×256<3> reconstruction. The acquisition length is purely defined by the need to collect enough respiratory phases.

Figure 4:
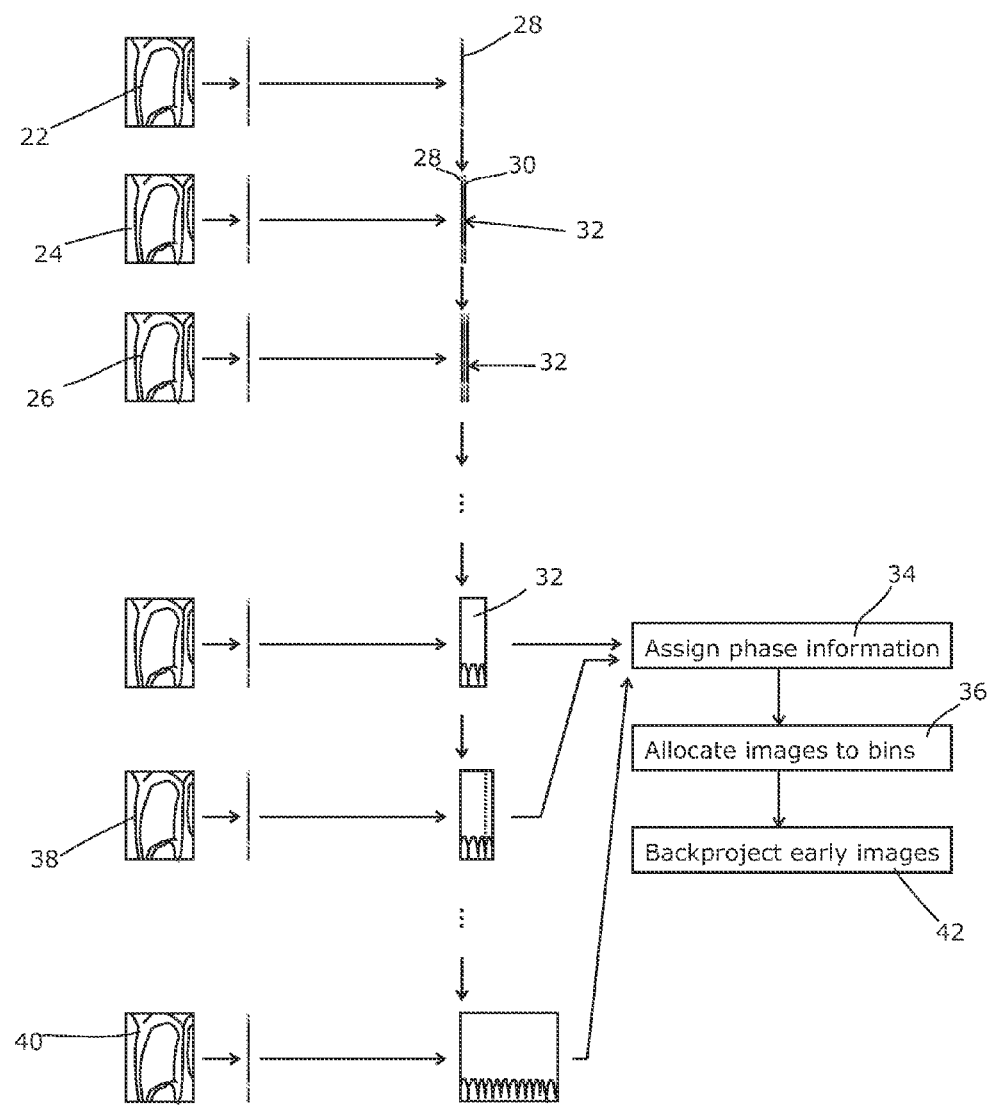
FIG. 4 illustrates the in-line phase determination method.
Figure 5:
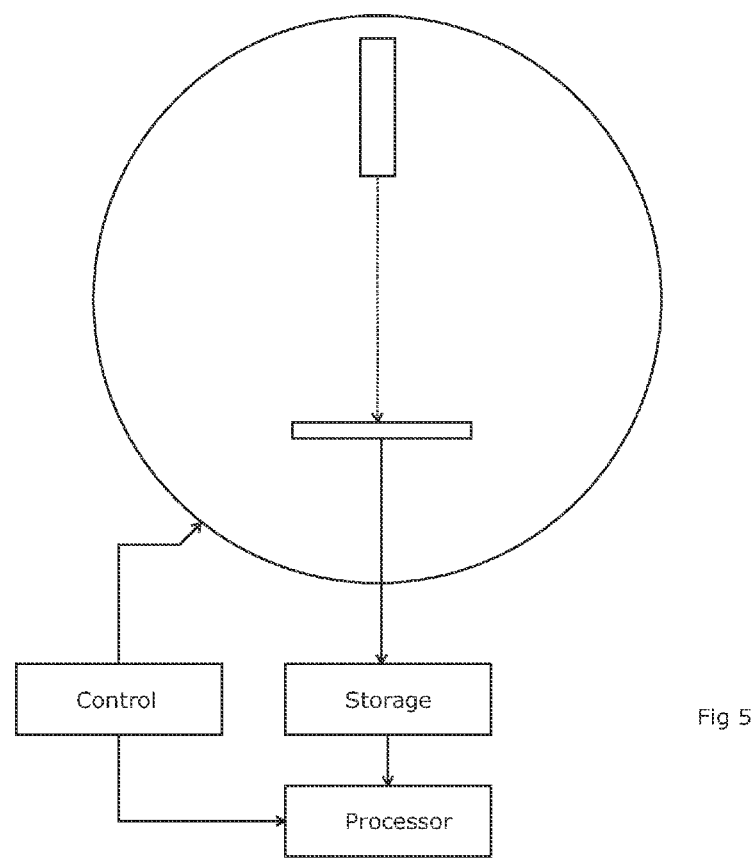
FIG. 5 illustrates the imaging system condensing and collating the images.

Further details of this process are illustrated in FIG. 4. A series of images 22, 24, 26 are obtained sequentially from the flat panel imager as the scanning apparatus rotates around the patient. Each is averaged in the transverse direction; averaging of the first image 22 yields a ID image 28 that is stored. Averaging the second image 24 yields a further ID image 30 that is added to the first ID image 28 to form a composite image 32 that is two pixels wide. Once the third image 26 becomes available, it is averaged to form a third ID image that is added to the composite image 32 which then grows to three pixels wide. This process continues, with the composite image growing steadily.

Eventually, the composite image 32 will have grown to a size where phase information can be ascertained. At this point, the phase information is extracted at 34 and used to allocate 36 the images obtained up to that point into bins based on their phase in the respiration cycle. Meanwhile, scanning continues, images 38, 40 continue to arrive, and the composite image 32 continues to grow. New images can then be phase-allocated substantially immediately, and allocated to bins.

Once the early images are allocated to a bin, they can be backprojected 42 in parallel with the other processes taking place, i.e. image acquisition, image processing, and phase allocation. This will mean that reconstruction of the 3D or 4D volume can in effect commence prior to the acquisition of all images. In combination with a fast reconstruction algorithm, this is able to give a useable 4D reconstruction very quickly after scanning and while treatment is still in progress.

4D Image Analysis

For treatment planning purposes, a single frame from a "regular" 4D CT scan was selected where the tumor was closest to its time-weighted mean position. This method is called the mid-ventilation approach and has the advantage that a regular 3D planning system can be used for delineation and IMRT optimization while suppressing systematic errors previously introduced using 3D planning CT. This single frame is also used as a reference image to which the 4D CBCT is compared. Prior to the first fraction, the reference data is imported into the Synergy system and a shaped region of interest is generated automatically around the delineated planning CT volume with a 5 mm margin, so that sufficient edge information is present inside the region of interest. This shaped region is then registered to each of the frames of the 4D CBCT using a grey value registration algorithm using the correlation ratio cost function, as has been used for prostate localization and 4D CT analysis. To avoid erroneous results, however, it is important that any bone structures (such as ribs) that may fall into the shaped region are edited out, as motion of bone and tumor is generally non concordant. During registration of the tumor, rotation is best disabled to avoid the erroneous identification of rotation in cases where the tumor is generally round or spherical.

The result of the registrations defines the motion curve of the tumor. For validation, the 4D CBCT can be animated, applying the registration result to each frame. A correct registration will therefore cause the tumor in each phase to fit the tumor in the reference image, and it will therefore "stand still" in the image. In this way, registration problems can be quickly recognized by a user. After acceptance by the user, the mean displacement of the tumor relative to the reference image is computed and used to shift the couch.

Image Quality and Algorithm Robustness

A comparison of the new and old phase extraction algorithms show only small differences in extracted phase. In terms of reconstruction image quality, the new algorithm performs equally well as the original algorithm. However, because of the absence of thresholds in the algorithm, there are some advantages and potential disadvantages. An advantage is that the algorithm locks equally well on small structures as on bigger structures. For instance, the new algorithm works even when the diaphragm is not in the field of view. A disadvantage of the algorithm is that when the tumor and the diaphragm move out of phase, the phase selection can become less clear. Generally, this problem is more apparent that real, probably because the algorithm will in any case focus on the brightest structure. The limited look-ahead means that a 4D scan will be available almost immediately after scanning, while it has almost no impact on the phase detection.

Clinical Application

Figure 3:
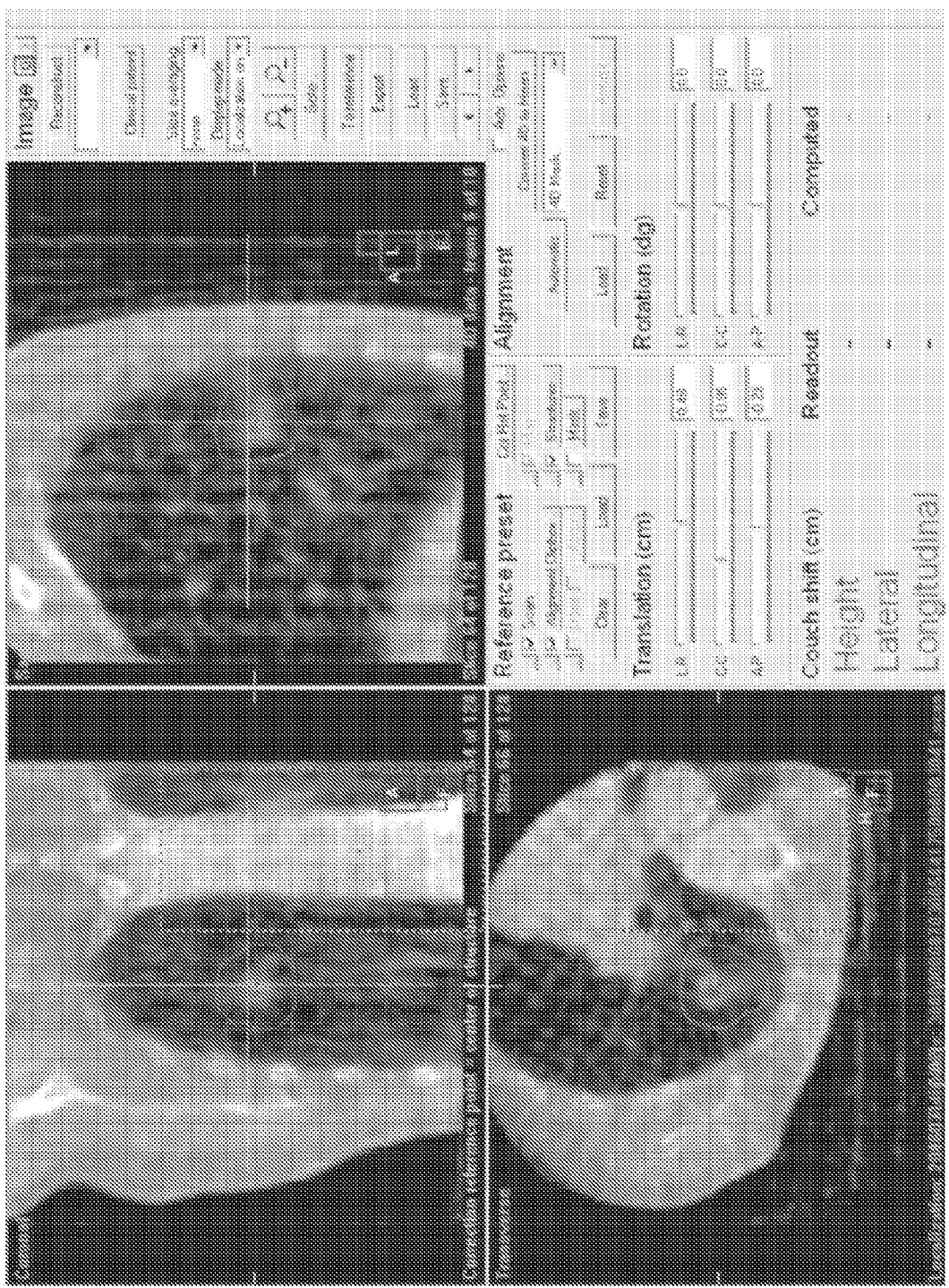
FIG. 3 shows a typical user interface.

The layout of the user interface for a clinical application for 4D cone beam image guidance is shown in FIG. 3. First, the user registers automatically on bony anatomy (applying the average of all phases). This provides an initial guess for tumor registration. Then, the match function switches to 4D registration. All phases are next matched automatic on tumor taking less than 1 minute in total. The animation function is then enabled automatically in "reverse motion" mode, which should therefore keep the tumor still if all is correct. In this way, overlaying the GTV contour and slicing through the tumor in axial, coronal and sagital view with animation active is adequate to visually confirm tumor coverage. Finally, the registration results are averaged, allowing the user to confirm symmetric tumor motion around the corrected position and visualizing the adequacy of the PTV coverage. Although the process sounds complicated, it is generally executed in about 4 minutes including visual verification. The total time for a hypofractionated treatment ranges from 34-60 minutes, of which the treatment time (in particular the manual couch rotations) is the largest component. The image guidance component of this total time is therefore acceptable. In our research protocol setting, two additional 3D scans (of about 1 minute) are also acquired to validate setup correction and patient stability.

FIG. 3 shows the screen layout of the software for on-line 4D cone beam CT guided radiotherapy. This example shows registration of a central lung tumor, after registering all frames to the planning CT on a mask that is slightly smaller than the PTV. The correct registration with almost 1 cm tumor motion is visible because the tumor is centred in the PTV. When this view is animated, the tumor remains centred in all phases of the 4D CBCT.

Thus, we have provided a system that can acquire 4D CT data on the treatment machine and use it for on-line image-guidance. By integrating highspeed image reconstruction with 4D image registration tools, automatic 4D localization of lung tumors can be performed in about 8 minutes, which includes 4 minutes of image acquisition. This is fast enough to guide hypofractionated treatments. In this way, patients can be treated without rigid immobilization or implanted markers. To deal with respiratory motion during treatment, small margins are used.

It will of course be understood that many variations may be made to the above-described embodiment without departing from the scope of the present invention.

Although the present invention has been described with reference to preferred embodiments, workers skilled in the art will recognize that changes may be made in form and detail without departing from the spirit and scope of the invention.

The invention claimed is:

1. An imaging system for an object exhibiting internal periodic motion comprising;
    a source of penetrating radiation and a two-dimensional detector for the radiation, the source and the detector being rotatable around an axis lying on the beam path from the source to the detector
    a storage means for images obtained from the detector
    a control means for initiating rotation of the source and the detector and for obtaining images from the detector at a plurality of rotation angles over time and for placing images in the storage means
    a processing means for
        condensing the images in a direction transverse to an axis to produce a one-dimensional image
        collating the one-dimensional images obtained to produce a two dimensional image
        analysing the two-dimensional image thus obtained to identify periodic patterns
        allocating phase information to the images in the storage means on the basis of that analysis selecting images in the storage means having like phase information backprojecting the selected images the control means being adapted to invoke the processing means after a plurality of images have been placed in the storage means and whilst further images are being obtained and stored, and then to place further images in the storage means and further to invoke the processing means.

2. The imaging system according to claim 1 in which the images are filtered prior to processing.

3. The imaging system according to claim 2 in which the penetrating radiation comprises x-radiation.

4. The imaging system according to claim 2 in which the two-dimensional detector is a flat panel detector.

5. The imaging system according to claim 2 in which the object is a patient.

6. The imaging system according to claim 5 in which the motion is breathing.

7. The imaging system according to claim 2 in which the images are selected by allocating images to one of a plurality of bins, with images having like phase information being allocated to the same bin.

8. The imaging system according to claim 1 in which the penetrating radiation comprises x-radiation.

9. The imaging system according to claim 8 in which the two-dimensional detector is a flat panel detector.

10. The imaging system according to claim 8 in which the object is a patient.

11. The imaging system according to claim 10 in which the motion is breathing.

12. The imaging system according to claim 8 in which the images are selected by allocating images to one of a plurality of bins, with images having like phase information being allocated to the same bin.

13. The imaging system according to claim 1 in which the two-dimensional detector is a flat panel detector.

14. The imaging system according to claim 13 in which the object is a patient.

15. The imaging system according to claim 14 in which the motion is breathing.

16. The imaging system according to claim 13 in which the images are selected by allocating images to one of a plurality of bins, with images having like phase information being allocated to the same bin.

17. The imaging system according to claim 1 in which the object is a patient.

18. The imaging system according to claim 17 in which the motion is breathing.

19. The imaging system according to claim 17 in which the images are selected by allocating images to one of a plurality of bins, with images having like phase information being allocated to the same bin.

20. The imaging system according to claim 1 in which the images are selected by allocating images to one of a plurality of bins, with images having like phase information being allocated to the same bin.

* * * * *